United States Patent
Altschul et al.

(10) Patent No.: US 12,282,744 B2
(45) Date of Patent: Apr. 22, 2025

(54) STATISTICAL LANGUAGE MODELS FOR SIMULATING COMMUNICATION SESSIONS

(71) Applicant: ASAPP, INC., New York, NY (US)

(72) Inventors: Samuel Andrew Altschul, New York, NY (US); Ramya Ramakrishnan, Princeton, NJ (US); Hashan Buddhika Narangodage, Jersey City, NJ (US); Kilian Quirin Weinberger, Ithaca, NY (US); Tianyi Zhang, Stanford, CA (US)

(73) Assignee: ASAPP, INC., New York, NY (US)

( * ) Notice: Subject to any disclaimer, the term of this patent is extended or adjusted under 35 U.S.C. 154(b) by 102 days.

(21) Appl. No.: 17/189,081

(22) Filed: Mar. 1, 2021

(65) Prior Publication Data

US 2022/0277149 A1    Sep. 1, 2022

(51) Int. Cl.
| | |
|---|---|
| G06F 40/56 | (2020.01) |
| G06F 40/284 | (2020.01) |
| G06F 40/35 | (2020.01) |
| G06N 3/08 | (2023.01) |
| G06N 7/01 | (2023.01) |

(52) U.S. Cl.
CPC ............ *G06F 40/56* (2020.01); *G06F 40/284* (2020.01); *G06F 40/35* (2020.01); *G06N 3/08* (2013.01); *G06N 7/01* (2023.01)

(58) Field of Classification Search
None
See application file for complete search history.

(56) References Cited

U.S. PATENT DOCUMENTS

| | | | |
|---|---|---|---|
| 10,552,764 B1 | 2/2020 | Carlin | |
| 10,818,193 B1* | 10/2020 | Sullivan | ............... G09B 19/04 |
| 2018/0053119 A1* | 2/2018 | Zeng | ................. H04M 3/5183 |
| 2022/0084510 A1* | 3/2022 | Peng | .................... G10L 15/063 |

OTHER PUBLICATIONS

Keskar, Nitish Shirish, et al., "CTRL: a Conditional Transformer Language Model for Controllable Generation", arXiv:1909.05858v2 [cs.CL], https://arxiv.org/pdf/1909.05858.pdf (accessed Dec. 16, 2022), Sep. 20, 2019, 18 pages.

(Continued)

*Primary Examiner* — Richa Sonifrank
(74) *Attorney, Agent, or Firm* — GTC Law Group PC & Affiliates

(57) ABSTRACT

A statistical language model may be used to simulate one or more users of a conversation. The statistical language model may be used to train a user to participate in a particular types of conversation by simulating communications by another type of user in the conversation. The communications may be simulated by selecting a simulation context from available simulation contexts and the simulation context may correspond to a difficulty level. Upon receiving a communication from a user, a responsive simulated communication may be generated by processing the received communication and the simulation context with the statistical language model. Upon completion of the simulation, another simulation context may be selected for the next simulation.

20 Claims, 7 Drawing Sheets

(56) References Cited

OTHER PUBLICATIONS

Tan, Bowen, et al., "Progressive Generation of Long Text with Pretrained Language Models", arXiv:2006.15720v2 [cs.CL], https://arxiv.org/pdf/2006.15720.pdf (accessed Dec. 16, 2021), Apr. 14, 2021, 12 pages.

Wallace, Eric, et al., "Universal Adversarial Triggers for Attacking and Analyzing NLP", rXiv:1908.07125v3 [cs.CL]. https://arxiv.org/pdf/1908.07125.pdf (accessed Dec. 16, 2022), Jan. 3, 2021, 15 pages.

\* cited by examiner

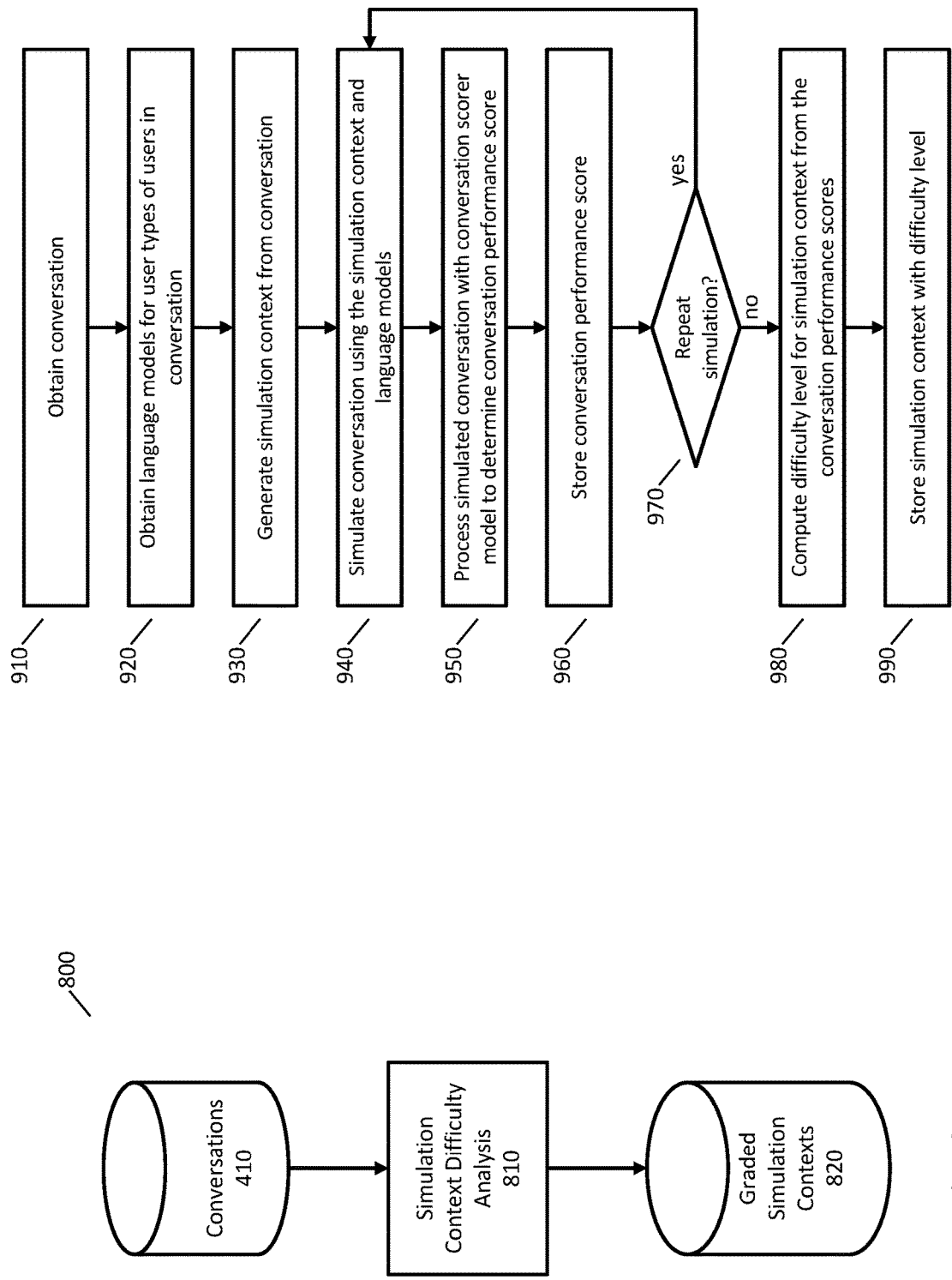

STATISTICAL LANGUAGE MODELS FOR SIMULATING COMMUNICATION SESSIONS

BACKGROUND

In various scenarios, a person may need training for learning how to communicate in a particular type or style of conversation. A person may receive training from another, more experienced person, but performing such training may be expensive, may be time consuming, and may not be adapted to the specific needs of the person receiving training. Accordingly, it may be desired to allow a person to receive training through an automated process using statistical techniques.

BRIEF DESCRIPTION OF THE FIGURES

The invention and the following detailed description of certain embodiments thereof may be understood by reference to the following figures:

FIG. 8 is an example system for generating graded simulation contexts.

FIG. 9 is a flowchart of an example method for generating a graded simulation context.

DETAILED DESCRIPTION

In various scenarios, a person or user may need training for learning how to communicate in a particular type or style of conversation. In such conversations, there may be two or more types of users participating in the conversations, such as a first user-type and a second user-type. The two user-types may communicate in different manners, such as in the content of likely communications or in the style or tone of communicating. To facilitate training, statistical language models may be used that are trained to represent communications or messages of particular user-types. For example, a first statistical language model may be trained to represent communications of a first user-type, and a second language model may be trained to represent communications of a second user-type. Such statistical language models may be used to simulate conversations and the simulated conversations may be used to train a person to perform better in conversations. The training process may be adapted to the needs of a person undergoing training, such as by adjusting a difficulty level to the performance of the person undergoing training.

The techniques described herein may be applied to any types of communication sessions with any number of people. The examples described herein may include a conversation between a customer and a support agent of a company, but the techniques described herein are not limited to these examples. The communications may take place using any form of natural language, such as text or speech.

Figure 1:
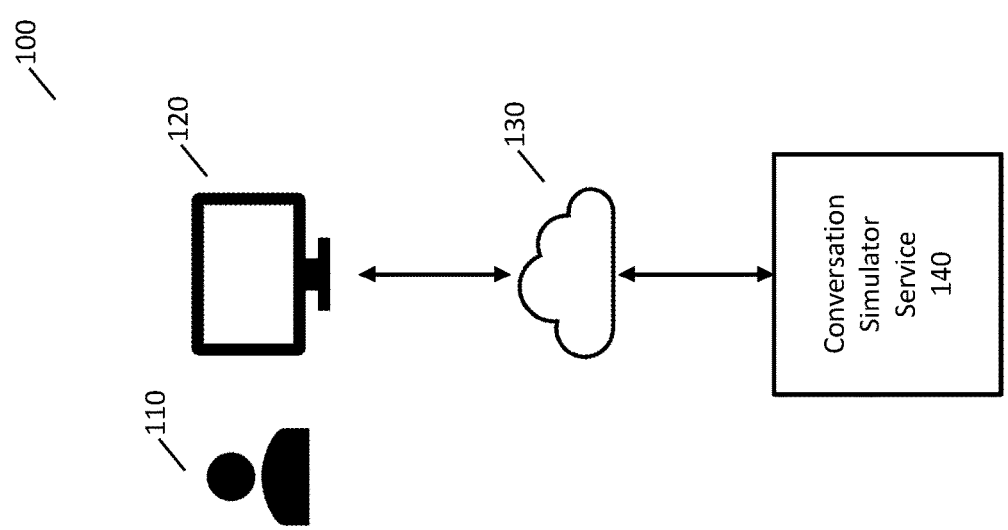
FIG. 1 is an example system for training a user using a conversation simulator service.

FIG. 1 is an example system 100 for training a user using a conversation simulator service. In FIG. 1, a user 110 of a first user-type is undergoing training. User 110 is undergoing training with the assistance of user device 120. User device 120 may be any appropriate computing device, such as computer, tablet, or phone. User device 120 may be running any appropriate software to allow user 110 to undergo training.

In some implementations, user device 120 may perform the training using installed software in a standalone manner such that no other devices are assisting in the training. In some implementations, user device 120 may use a service provided over a network connection. For example, user device 120 may use network 130 to access a conversation simulator service 140. In such implementations, user device 120 and conversation simulator service 140 may jointly provide the training to user 110. User device 120 and/or conversation simulator service 140 may simulate communications of a second user-type for presentation to user 110.

Figure 2:
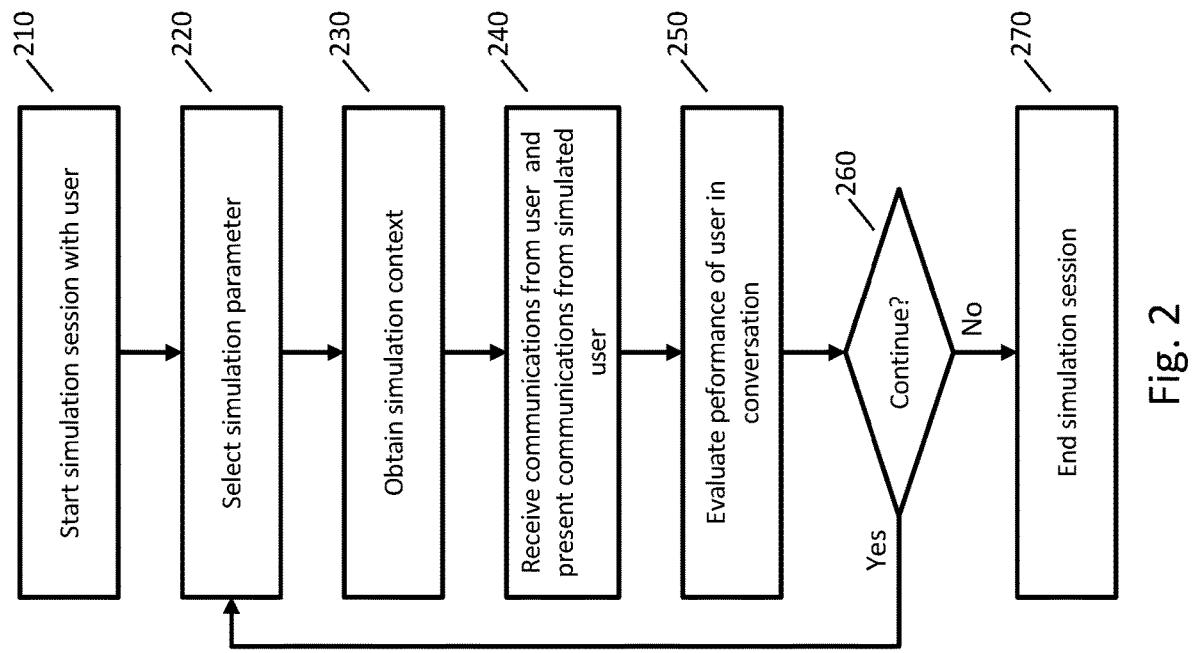
FIG. 2 is a flowchart of an example method for implementing a simulation session.

FIG. 2 is a flowchart of an example method for implementing a simulation session.

At step 210, a simulation session is started with a user of a first user-type to simulate a conversation with a simulated user of a second user-type. Any appropriate techniques may be used to start the simulation session. For example, the user may create an account with a simulator service, may login with a username and password, or may provide information about him or herself relating to the simulation (e.g., information about the first user-type, job level, years of experience, or length of time as an employee at a company).

At step 220, a simulation parameter is selected. Any appropriate simulation parameter may be selected using any appropriate techniques. For example, the simulation parameter may be a difficulty level selected using information about the user, such as an experience level or performance in a previous simulation session.

At step 230, a simulation context is obtained using the simulation parameter. A simulation context may include any appropriate information to instruct or guide the content or types of communications generated by the conversation simulator. In some implementations, a datastore or library of simulation contexts may be available. The simulation contexts in the datastore may be each be associated with value (e.g., a difficulty level) and a simulation context may be chosen by comparing the simulation parameter with the values of the simulation contexts in the datastore.

In some implementations, a simulation context may include a sequence of communications. For example, a company may have an archive of conversations between users of a first user-type and users of a second user-type (e.g., an archive of customer support conversations). A number of initial communications (such as 3-5 communications) of an archived conversation may be used as the simulation context. The simulation context may be used to guide the conversation simulator, such as by generating communications about a particular subject matter, with a particular tone, or according to the needs or desires of a user who was participating in the archived conversation. Other types of simulation contexts may also be used, such as described in greater detail below.

At step 240, one or more communications are received from the user and one or more simulated communications are generated and presented to the user as being from the simulated user. The communications may be received and presented in any order. For example, communications from the user may be alternated with communications presented to the user. The simulated communications may be generated using a statistical language model, the simulation context, and any previous communications of the simulation session. The communications may be generated such that a simulated communication is responsive to a previous communication of the user and the simulated communication may be similar to a communication that would be expected from a real user of the second user-type. Communications may be received and presented until a stopping criterion is met, such as a number of communications, the language model generates a token indicating that the conversation has ended, or it is determined that an objective has been reached in the conversation (e.g., the user satisfactorily resolved an issue of the simulated user)

At step 250, the performance of the user in the conversation may be evaluated. Any appropriate techniques may be used to evaluate the performance of the user. For example, the communications of the simulation session may be processed with a mathematical model, such as a neural network or a classifier, to determine a performance score. The performance score may be related to any appropriate objective, such as achieving customer satisfaction or making a sale.

At step 260, it is determined whether to continue with another simulated conversation with the user. Any appropriate techniques may be used to determine whether to continue with another simulated conversation, such as a request of the user (or another user such as a manager), an amount of time spent in the simulation session, or the performance of the user in the most recent simulated conversation. If it is decided to continue with another simulated conversation, then processing proceeds to step 220 where a simulation parameter may be selected for the next simulated conversation. For example, where the user performed well in the previous simulated conversation, a difficulty level may be increased for the next simulated conversation. If it is decided not to continue with another simulated conversation, then processing may proceed to step 270 where the simulation session is ended.

To generate simulated communications in a conversation simulation session, such as described above, a statistical language model may be used. Any appropriate statistical language model may be used, such as a neural network language model or an n-gram language model. Now described are example techniques for creating or computing a statistical language model.

Figure 3:
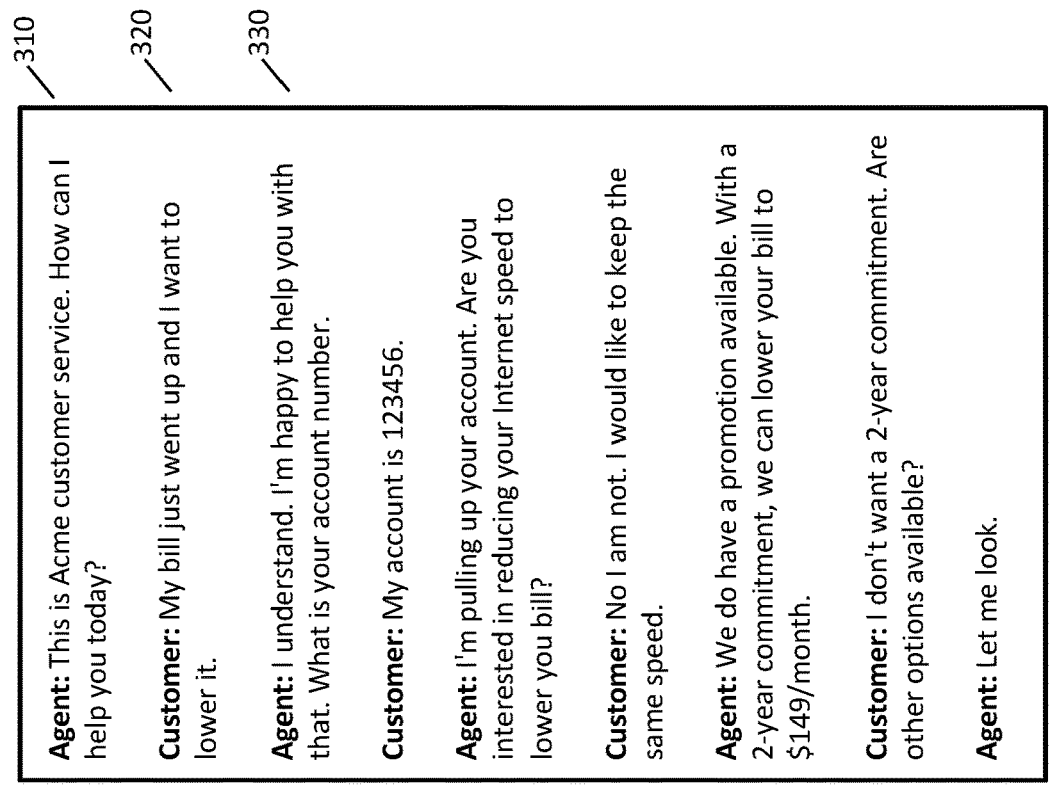
FIG. 3 is an example conversation that may be included in a training corpus to train a language model.

A language model may be trained from a corpus of training data. Since different people in different scenarios may have conversations about different subject matters and using different communication styles, it may be desired to obtain a corpus of training data that includes examples of a particular type or style of communication. For example, where a conversation simulator is being used train customer service agents to speak with customers, a training corpus may include examples of conversations between agents and customers. FIG. 3 is an example conversation that may be included in a training corpus to train a language model.

In addition, different users in the same conversation may communicate about different aspects of the subject matter and with different communication styles. For example, with a customer and an agent, the customer may be describing problems, and the agent may be describing solutions. In addition, the style of the customer may be less formal and the style of the agent may be more formal.

Generally, a conversation may include a first user of a first user-type and a second user of a second user-type. To model both sides of the conversation, it may be desired to create a first statistical language model for the first user-type and a second statistical language model for the second user-type. For some conversations, more than two types of users may be involved, and more than two language models may be created.

Figure 4:
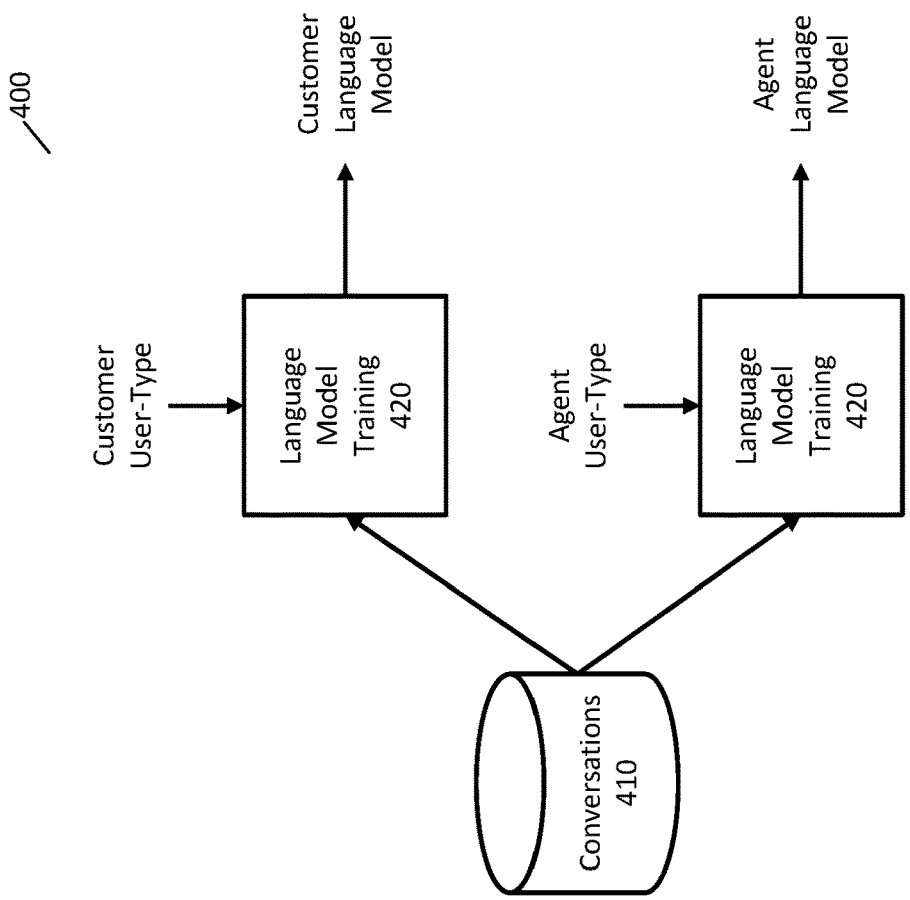
FIG. 4 is an example system for training a statistical language model from training data.

FIG. 4 is an example system 400 for training a statistical language model from training data. In FIG. 4, conversations data store 410 may be used as training data for the language model. Conversations data store 410 may include any appropriate data, such as an archive of existing conversations or an archive of customer support logs. In the training data, the communications may each be marked or annotated with a user-type of the user who made or transmitted the communication.

Language model training component 420 may process the training data to generate a statistical language model for the training data as a whole or for a subset of the training data, such as a specific user-type. Language model training component 420 may receive an input to indicate the type of language model to be created. For example, the input may be a user-type that instructs language model training component 420 to create a language model for that user-type. In the example of FIG. 4, a first instance of language model training component 420 is used to create a customer language model and a second instance of language model training component 420 is used to create an agent language model.

A language model may process a portion of text and compute probabilities for text that may follow the portion of text. For example, consider the text "1600 Pennsylvania". The probability that the following word is "Avenue" is high but the probability that the following word is "elephant" is low. Language models are able to provide such probabilities for any provided input text.

When processing text, language models may break the text up into portions. Any appropriate text portions may be used. For example, language models may process characters to predict a next character, process words to predict a next word, or process tokens to predict a next token.

In natural language processing, a token may represent any portion of text, such as a character, word, multiple words, part of a word, or parts of multiple words. For clarity of presentation, tokens may be presented herein as words, but tokens are not limited to words and any appropriate tokens may be used. For example, text may be tokenized using byte-pair encodings or word-piece encodings.

In addition to tokens representing text, special tokens may be used to provide information relating to the text. For example, in some implementations, a <start> token may be used to indicate the start of a communication, and an <end> token may be used to indicate the end of a communication. For another example, a token may indicate the user-type of the next communication, such as a <customer> token to indicate that the next communication is from a customer and an <agent> token to indicate that the next communication is from an agent.

Language models may process and/or generate these special tokens. For example, let [AM1] represent the tokens of communication 310 of FIG. 3. A language model may process "<agent>[AM1]<customer>" and then generate probabilities of a first token of a customer response. Here, the first token <agent> informs the language model that subsequent tokens correspond to a communication from an agent, and the token <customer> informs the language model that the communication from the agent has ended and that a communication from a customer comes next. The language model may process all of these tokens and to generate the probabilities of first token of the customer communication.

Suppose that the highest probability token above is "My" and that this token is selected as the first token for a simulated communication from a customer. The language model may then be used to generate a second token of a simulated customer communication. The language model may process "<agent>[AM1]<customer>My" and then generate probabilities for the next token. Since the language model is able to process the tokens of the agent communication, the language model may be able to generate a customer communication that is responsive to the agent communication similar to a communication that a real customer would provide. The process may continue until a stopping criterion is reached, such as an end-of-communication token or an agent token indicating that an agent communication is next.

A language model may also process more than one communication to simulate a next communication. Let [CM1] represent the tokens of communication 320 and [AM2] represent the tokens of communication 330. A language model may process "<agent>[AM1]<customer>[CM1]<agent>[AM2]<customer>" and then generate probabilities of a first token of a next customer response. As above, this process may be repeated to generate a simulated customer communication that is responsive to the previous communications.

Although any type of statistical language model may be used, now described are two examples of statistical language models that may be used for any of the techniques described herein.

Figure 5:
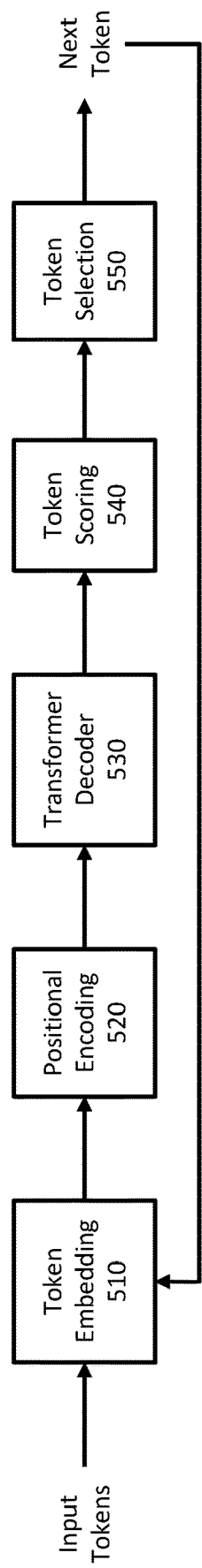
FIG. 5 is an example of a transformer language model that may be used to generate a simulated communication.

FIG. 5 is an example of a transformer language model that may be used to generate a simulated communication from previous communications. In FIG. 5, the transformer language model receives input tokens as input, such as the tokens described above, and generates a next token. That next token may then be added to the input tokens to generate another next token. This process may be repeated until a stopping criterion has been reached.

In FIG. 5, the input tokens are processed by token embedding component 510 to obtain a token embedding for each input token. A token embedding is a representation of a token in a vector space such that the token embedding includes relevant information about the token. For example, in some implementations, a token embedding may preserve information about the meaning of the token. Two tokens that have similar meanings may have token embeddings that are close to each other in the vector space. By contrast, two tokens that do not have similar meanings may have token embeddings that are not close to each other in the vector space.

Any appropriate token embeddings may be used. In some implementations, the token embeddings may not be contextual. Where token embeddings are not contextual, a token may have the same token embedding regardless of the tokens that come before or after the token. Non-contextual token embeddings may be computed using any appropriate techniques, such as GloVe and word2vec. In some implementations, token embeddings may be contextual. Where token embeddings are contextual, the token embedding of a token may depend on previous or subsequent tokens. For example, the token "bank" in the phrases "river bank" and "bank deposit" may have different values according to the two very different meanings of "bank." Contextual token embeddings may be computed using any appropriate neural network, such as an LSTM neural network or a transformer neural network.

Positional encoding component 520 may process the token embeddings and add additional information indicating the position of each token in the sequence of tokens. The meaning of a communication may depend on the positions of tokens in relation to each other, and by including this position information, the overall language model may be better able to understand the meaning of the input tokens and compute more accurate probabilities for the next token.

Any appropriate positional encoding may be used. In some implementations, the positional encoding may include a vector of sinusoidal and cosinusoidal values following a geometric progression of frequency values. In some implementations, a positional encoding may implemented using a positional embedding for up to specified number of possible tokens. The positional encodings may be combined with the token embeddings using any appropriate techniques. For example, for each token, the output may be a sum of the token embedding and the positional embedding or a concatenation of the token embedding and the positional embedding.

Transformer decoder component 530 may process the output of positional encoding component 520 with one or more transformer decoder blocks. Each transformer decoder block may process the output of a previous transformer decoder block. A transformer decoder block includes a masked self-attention layer that is masked so that attention for a token may only depend on previous tokens. A transformer decoder block also includes a feed forward neural network layer. The transformer decoder blocks are able to learn sequences of tokens that are more probable than others and allows the transformer language model to provide accurate probabilities for the next token.

Token scoring component 540 processes the output of transformer decoder component 530 to compute values or scores that may be used to select likely next tokens. Token scoring component 540 may be implemented using any appropriate techniques such as one or more linear neural network layers and/or a softmax layer. In some implementations, token scoring component 540 may output probabilities or log probabilities corresponding to the next token, such as a vector with a probability or a log probability for each possible next token.

Token selection component 550 processes the output of token scoring component 540 to select one or more tokens to follow the input tokens. Any appropriate techniques may be used, such as nucleus or top-p sampling or top-k sampling. With nucleus sampling, a number of most probable tokens may be selected such that their cumulative probabilities are above a threshold, the probabilities may be renormalized to sum to 1, and a token may be sampled according to the normalized probabilities. With top-k sampling, a number of most probable tokens may be selected, the probabilities may be renormalized to sum to 1, and a token may be sampled according to the normalized probabilities. In some implementations, token selection component 550 may select more than one token at each iteration and a beam search may be performed to select a most probable sequence of tokens.

After a next token is selected, a new set of input tokens may be created by combining the existing input tokens with the just-generated next token, such as by concatenating the next token to the existing input tokens. The transformer language model may then process the new set of input tokens to generate another next token. The transformer language model may accordingly be used to iteratively generate tokens of a simulated communication, and the process of generating a next token may be repeated until a stopping criterion is met.

Figure 6:
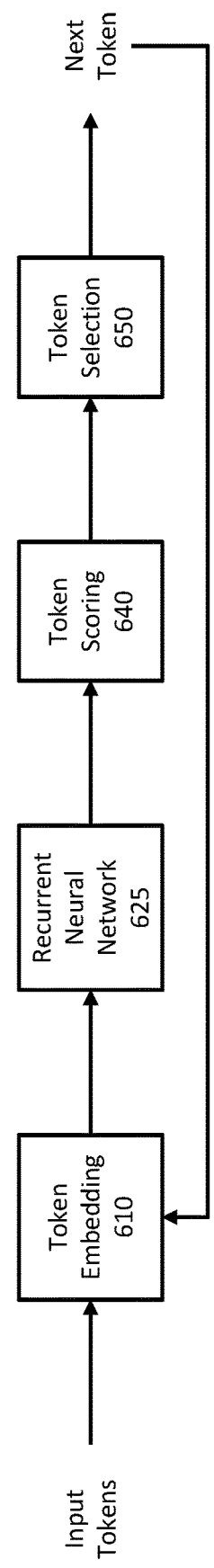
FIG. 6 is an example of an autoregressive language model that may be used to generate a simulated communication.

FIG. 6 is an example of an autoregressive language model that may be used to generate a simulated communication from previous communications. Similar to the transformer language model, the autoregressive language model receives input tokens as input and generates a next token. That next token may then be used to generate another next token. This process may repeat until a stopping criterion has been reached.

In FIG. 6, the input tokens are processed by token embedding component 610 to obtain a token embedding for each input token. Token embedding component 610 may use any of the techniques described above for token embedding component 510.

Recurrent neural network component 625 may sequentially process the token embeddings with one or more recurrent neural network (RNN) layers. The RNN layers are able to learn sequences of tokens that are more probable than others and allow the autoregressive language model to provide accurate probabilities for the next token. Recurrent neural network component 625 may be implemented using any appropriate techniques, such as a forward RNN layer, a backward RNN layer, a bidirectional RNN layer, an RNN layer with long short-term memory units, an RNN layer with gated recurrent units, or an RNN layer with simple recurrent units.

Token scoring component 640 processes the output of recurrent neural network component 625 to compute values that may be used to select likely next tokens. Token scoring component 640 may use any of the techniques described above for token scoring component 540.

Token selection component 650 processes the output of token scoring component 640 to select one or more tokens to follow the input tokens. Token selection component 650 may use any of the techniques described above for token selection component 550.

After a next token is selected, it may be used to iteratively obtain another next token and so forth. As shown in FIG. 6, the next token may be processed by token embedding component 610 to allow the autoregressive language model to generate another next token. One difference with the transformer language model is that the original input tokens may not need to be reprocessed. With the transformer language model all of the tokens (including the original input tokens) may need to be processed each time a next token is generated. With the autoregressive language model, after generating the first next token, the input tokens may not need to be reprocessed. Instead, just the most recent next token may need to be processed to generate another next token.

Statistical language models (e.g., transformer language models and autoregressive language models) may be trained from a training corpus, such as conversations data store 410, using any appropriate techniques. Training techniques may include supervised training or unsupervised training. The training of a language model may comprise multiple rounds where each round updates the parameters of the language model by minimizing a loss function using, for example, stochastic gradient descent. At each round, the input tokens of the language model may be set to a portion of a conversation (e.g., all tokens in a conversation up to a certain token), and the output of the language model may be set to the actual token that comes after the input tokens. A forward pass may be performed using the input tokens, an error may be computed using the next token, and a backward pass may be performed to update the parameters of the language model. This training process may proceed until a suitable stopping or convergence criterion is reached.

Other variations of a statistical language model are possible. In some implementations, a language model may be combined with a retrieval model to limit the scope of communications that may be generated by the language model. For example, a retrieval model may include a pre-approved list of communications that may be generated, and the language model may be constrained to only generate one of the preapproved communications. In some implementations, a language model may generate a list of possible communications, and the list of generated communications may be ranked according to other factors. For example, a distance may be computed between each generated communication and each preapproved communication from a retrieval model (e.g., by computing a distance between embedding vectors for the communications), the generated communications may be ranked according to the shortest distance, and the top-ranking generated communication may be selected.

Another aspect of the method of FIG. 2 is evaluating the performance of a user in a simulated conversation. Now described are example techniques for processing a conversation to determine the performance of a user in the conversation.

In some implementations, a mathematical model (such as a neural network) may be trained to process a conversation and provide a score indicating a performance of a user in the conversation. The score may relate to any appropriate aspect of performance that may be of interest, such as the satisfaction of a customer, whether a sale was made, or the tone or demeanor of the user in the conversation.

To train a conversation scorer model, a training corpus of data may be obtained. Conversations in the training corpus may be labeled with a score or another indication of performance. The training corpus may be labeled using any appropriate techniques, such as manual labelling by people or labelling using other available data, such as whether a purchase was made during the conversation.

Figure 7A:
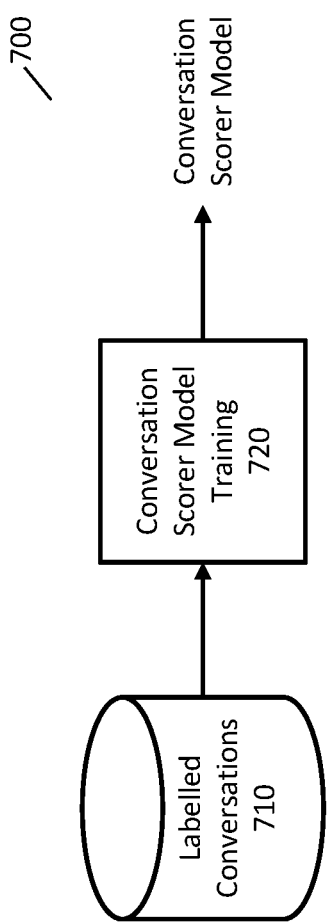
FIG. 7A is an example system for training a conversation scorer model.

FIG. 7A is an example system 700 for training a conversation scorer model. In FIG. 7A, labeled conversations datastore 710 may be used to train the model. Labeled conversations datastore 710 may include any appropriate labeled conversations, and the conversations may be labeled using any appropriate techniques. For example, labeled conversations datastore 710 may include logs from customer support sessions where the conversations have been manually labeled.

Conversation scorer model training component 720 may be used train a conversation scorer model using the training data in labeled conversations datastore 710. Conversation scorer model training component 720 may use any appropriate training techniques, such as any of the training techniques described herein. Conversation scorer model training component 720 may train any appropriate mathematical model such as a neural network classifier.

Figure 7B:
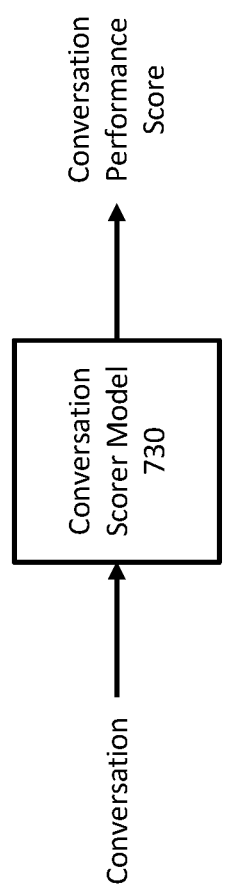
FIG. 7B is an example conversation scorer model.

FIG. 7B is an example conversation scorer model 730 that may be used to process a conversation and compute a conversation performance score. Conversation scorer model 730 may be any appropriate mathematical model, such as a neural network classifier. In some implementations, conversation scorer model 730 may process the entire conversation. In some implementations, conversation scorer model

730 may process a portion of the conversation, such as a most recent number of communications or communications by one user of the conversation.

In some implementations, conversation scorer model 730 may process conversation text that includes special tokens indicating the start of communications by specific user-types, such as the <customer> and <agent> tokens described above. Conversation scorer model 730 may receive as input a user-type input to indicate the user of the conversation whose performance is to be evaluated.

Another aspect of the method of FIG. 2 is obtaining a simulation context according to a specified simulation parameter. Now described are example techniques for evaluating a simulation context for facilitating selection according to a parameter.

A simulation context may be used, in a sense, to initialize the simulation. In a first sense, the simulation context provides guidance to the language model relating to aspects of the conversation, such as the subject matter and/or the mental state or emotions of a user in the conversation. In a second sense, the simulation context may also provide guidance to the user participating in the simulation as the first few communications of a conversation to be continued.

In some implementations, a simulation context may include a number of communications from a real conversations (e.g., from customer support logs) or a manually created conversation, such as the first 3-5 communications of a conversation. These communications will be referred to as the context communications. The context communications may include communications from more than one user (such as alternating communications between a customer and an agent). At the beginning of a conversation simulation, the context communications may be presented to the user participating in the simulation to set the stage for the simulation. The user may review the context communications and then provide a suitable subsequent communication. The context communications may also be used to guide the language model. The language model may process the context communications using any of the techniques described herein, and the language model will then use the context communications when determining a simulated next communication.

In some implementations, a simulation context may include other representations of a real conversation or a manually created conversation. A representation of a conversation other than communications from the conversation will be referred to as the context representation. Any appropriate representation of a conversation may be used. In some implementations, for example, the context representation may include a summary of the conversation, a list of words in the conversation, or a bag-of-words representation of the conversation. The context representation may also be presented to the user in the simulation or processed by the language model to guide the language model in generating simulated communications.

In some implementations, a simulation context may include context communications but not a context representation. In some implementations, a simulation context may include a context representation but not context communications. In some implementations, a simulation context may include both context communications and a context representation When training a user to communicate in a conversation, it may be desired to change an aspect of the training over different simulated conversations or over different training sessions. In some implementations, it may be desired to increase the difficulty level as the performance of the user improves. In some implementations, it may be desired to change the topic or subject matter of the conversations over time. For example, a first conversation may be about a first topic (e.g., billing) and a second conversation may be about a second topic (e.g., technical support). Appropriate selection of simulation contexts may be used to change aspects of simulated conversations.

For clarity of presentation, a difficulty level will be used as an example of a simulation parameter to be used in selecting a simulation context, but the techniques described herein are not limited to using a difficulty level and any appropriate simulation parameter may be used.

FIG. 8 is an example system 800 for generating graded simulation contexts from an archive of conversations. In FIG. 8, conversations data store 410 may store information about conversations as described above. Simulation context difficulty analysis component 810 may process a conversation in conversations data store 410 to generate a graded simulation context. Simulation context difficulty analysis component 810 may also iterate over conversation in conversations data store 410 to generate graded simulation contexts for multiple conversations. The generated graded simulation context may be stored in graded simulation contexts datastore 820.

FIG. 9 is a flowchart of an example method for generating a graded simulation context from a conversation.

At step 910, a conversation is obtained. Any appropriate conversation may be obtained using any appropriate techniques.

At step 920, language models are obtained for the user-types of users in the conversation. For example, where the conversation is between a customer and an agent, a customer language model and an agent language model may be obtained. Any appropriate language models may be obtained, such as any of the language models described herein.

At step 930, a simulation context is generated from the conversation. Any appropriate techniques may be used to generate the simulation context. For example, where the simulation context includes context communications, a number of initial communications (e.g., 3-5 communications) may be selected from the conversation. For another example, where the simulation context includes a context representation, a context representation may be computed from the conversation, such as any of the context representations described herein.

At step 940, a conversation is simulated using the simulation context and the language models. The simulated conversation may be between, for example, a first simulated user modeled by a first language model and a second simulated user modeled by a second language model. Any appropriate techniques may be used to simulate the conversation. For example, where the simulation context includes context communications, a first language model may be used to generate a first simulated communication that follows the context communications. A second language model may be used to generate a second simulated communication that follows the first simulated communication, and so forth. Simulated communications may be generated until a suitable stopping criterion is reached.

At step 950, the simulated conversations are processed with a conversation scorer model to compute a conversation performance score for a first simulated user of the conversation. For example, where the simulated conversation is between a simulated customer and a simulated agent, a conversation performance score may be computed for the simulated agent.

At step 960, the conversation performance score is stored.

At step 970, it is determined whether to repeat the simulation using the simulation context. Any appropriate techniques may be used, such as specifying a number of repetitions or having sufficient data to compute an accurate difficulty level for the simulation context. Where it is determined to repeat the simulation, processing continues to step 940. Where it is determined not to repeat the simulation, processing continues to step 980.

At step 980, a difficulty level for the simulation context is computed from the conversation performance scores of the simulations. Any appropriate techniques may be used to compute the difficulty level. In some implementations, the difficulty level may be computed using an average of the conversation performance scores. In some implementations, the difficulty level may be percentage of simulated conversations that resulted in a desired outcome, such as a sale.

At step 990, a graded simulation context may be stored using the difficulty level from step 980 and the simulation context from step 930.

The simulation context used in a simulated conversation, in a sense, initializes or biases the possible communications that may be generated. For example, where the context communications in a simulation context are those of an angry customer, it is more likely that later generated communications will also be those of an angry customer. As a result, the simulated agent may be less likely to generate communications that cause a favorable outcome, the performance scores of simulated conversations may be lower, and the simulation context may have a higher difficult level. By contrast, where the context communications in a simulation context correspond to a customer who has already decided to purchase something, it is more likely that later generated communications correspond to a purchase, the performance scores of simulated conversations may be higher, and the simulation context may have an easier difficulty level.

The language models used in FIG. 9 are trained on a corpus of training data so may, in a sense, generate simulated communications corresponding to a typical or average user of the corresponding user-type. Where an average user performs well, the simulation context is less difficult, and where an average user performs poorly, the simulation context is more difficult.

Figure 10:
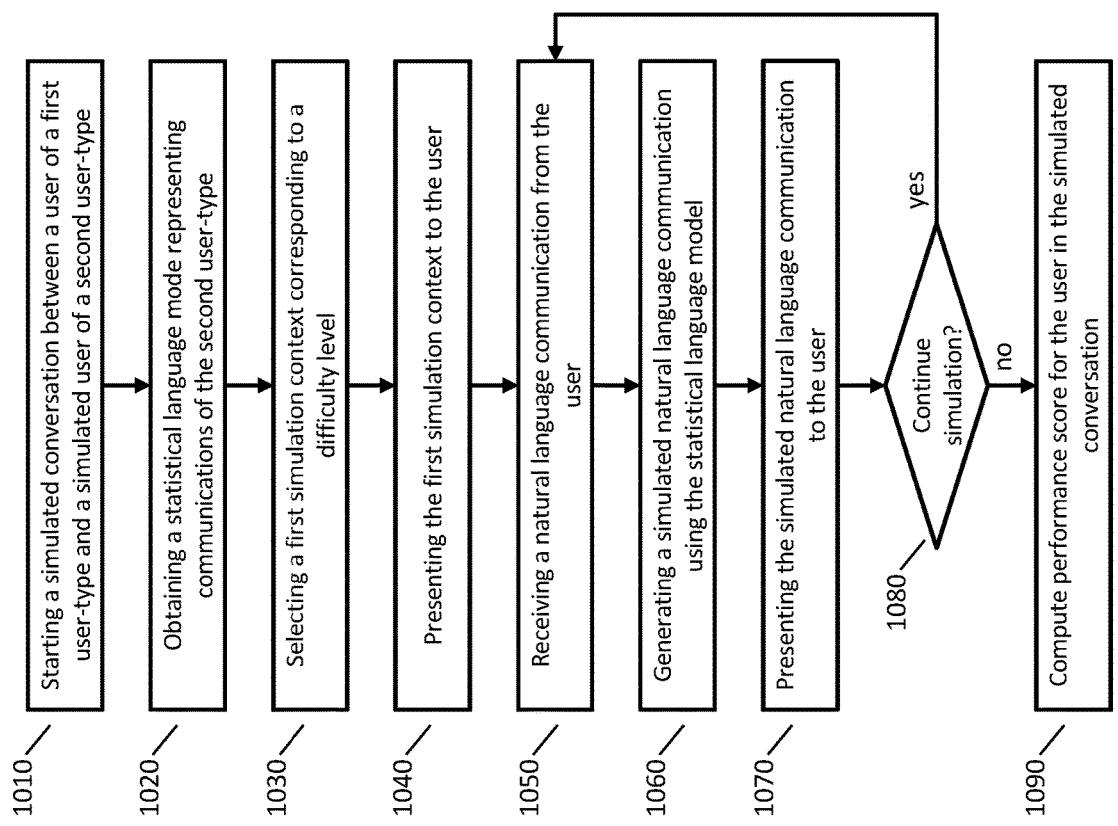
FIG. 10 is a flowchart of an example method for simulating a conversation between a user and a simulated user.

Graded simulation contexts may then be used to train a user to learn how to communicate in a particular style or type of conversation. FIG. 10 is a flowchart of an example method for simulating a conversation between a user and a simulated user. As above, for clarity of presentation, FIG. 10 is described using a difficulty level as an example of a conversation parameter, but the method of FIG. 10 is not limited to using a difficulty level and any appropriate conversation parameter may be used.

At step 1010, a simulated conversation is started between a user of a first user-type and a simulated user of a second user-type. Any appropriate techniques may be used to start a simulation session. For example, the user may login to a website or other software on a computer, may login with login credentials, and may perform any appropriate user interface actions to cause a simulated conversation to be started. The first user-type and second user-type may be any appropriate user-types, such as a customer and an agent. In some implementations, a simulation session may be started instead or in addition to starting a simulated conversation. A simulation session may include one or more simulated conversations, such as a user engaging in multiple simulated conversations in a single simulation session.

At step 1020, a statistical language model is obtained that represents communications of the second user-type. Any appropriate statistical language model may be used such as any of the language models described herein. As used herein, obtaining a statistical language model includes obtaining access to a statistical language model that is stored remotely, such as on a server computer. For example, a statistical language model may be obtained by establishing a network connection to a service that allows use of the statistical language model.

At step 1030, a first simulation context is obtained that corresponds to a first difficulty level. For example, the first simulation context may be selected from a datastore of available simulation contexts. Any appropriate techniques may be used to select the first simulation context.

In some implementations, a desired difficultly level may be determined for the simulated conversation, such as a difficulty level on a scale from 1 to 10 or 1 to 100. The desired difficulty level may be selected using any appropriate information, such as a difficulty level from a previous simulated conversation, a performance score of the user from a previous conversation, or a number of previous simulated conversations.

The desired difficulty level may then be used to select the first simulation context. For example, the first simulation context may be selected randomly from all available simulation contexts having a matching difficulty level. For another example, the first simulation context may be selected by selecting the simulation context whose difficulty level is closest to the desired difficulty level.

At step 1040, the first simulation context is presented to the user. For example, where the first simulation context includes context communications, the context communications may be presented to the user as the first few communications in a conversation, and the role of the user is to continue the conversation. The first simulation context may be presented using any appropriate techniques. For example, the first simulation context may be presented as audio and/or text.

In some implementations, step 1040 may not be performed. For example, where the first simulation context includes a context representation and does not include context communications, the context representation may be processed by the statistical language model, but the context representation may not be presented to the user.

At step 1050, a natural language communication is received from the user. Any appropriate techniques may be used, such as receiving text entered by the user or recording speech of the user and using speech recognition techniques to transcribe the speech.

At step 1060, a simulated natural language communication is generated using one or more of (i) the statistical language model, (ii) the simulation context, and (iii) any natural language communications received or generated during the simulated conversation. In some implementations, the statistical language model, the simulation context, and all natural language communications received or generated during the simulated conversation may be used. Any appropriate techniques may be used to generate the natural language communication, such as any of the techniques described herein.

At step 1070, the simulated natural language communication from step 1060 is presented to the user. The simulated natural language communication may be presented as coming from a simulated user of a second user-type. For example, the simulated natural language communication may be presented as text in a messaging application or as audio using text-to-speech techniques.

At step 1080, it is determined whether to continue the conversation simulation. Any appropriate techniques may be used, such as a stopping criterion. For example, the stopping criterion may include a length of time, a number of communications, the statistical language model generating an end-of-conversation token, or a determination that the simulated conversation was successful or not successful. Where it is determined to continue the simulated conversation, processing proceeds to step 1050 where another natural language communication may be received from the user. Where it is determined to end the conversation simulation, processing may proceed to step 1090.

Note that other variations of the above steps are possible. For example, instead of alternating receiving a communication from the user and generating and presenting a simulated communication, it may be allowed to receive more than one communication from the user or generate more than one simulated communication. In addition, the conversation may start with a simulated communication and may end with a communication received from the user.

At step 1090, a performance score is computed for the user in the simulated conversation. Any appropriate techniques may be used to compute a performance score, such as processing one or more (or all) communications of the simulated conversation with a conversation scorer model, such as the conversation score model described herein.

In some implementations, the user may, after step 1090, start another simulated conversation, such as when the user is in a simulation session that may include more than one simulated conversation. For the next simulated conversation, the difficulty level may be adjusted based on the performance of the user in the just completed simulated conversation. For example, where the user performed well (e.g., above a threshold) the difficulty level may be increased, where the user performed poorly (e.g., below a threshold) the difficulty level may be decreased, and where the user performance was in the middle (e.g., within a range) the difficulty level may stay the same.

For the next simulated conversation, the same statistical language model may be used. An advantage of the techniques described herein is that a single language model may be used to simulate conversations of varying difficulty levels and across different subject matters. By selecting an appropriate simulation context, the language model may be instructed to generate communications that are adapted to the user being trained.

Accordingly, a user may learn how to communicate in particular types or styles of conversations by practicing with simulated conversations where the simulated conversations may be similar to what is expected in real conversations. The use of a statistical language model to generate conversations of a user-type may provide more realistic simulated conversations and allow a user to learn more quickly.

A company that trains employees to participate in particular types of conversations may benefit from the techniques described herein. The cost of training employees may be decreased because employees may be trained using automated techniques instead of being trained by another person. Employees may be trained more quickly because the training sessions may be adapted to their skill level by choosing appropriate difficulty levels. Employees may obtain a higher degree of proficiency since the difficulty levels may continue to be increased to allow the employee to continue learning. A company using the techniques described herein may accordingly be able to train employees at lower cost and also obtain a higher quality work force.

The techniques described herein may be more effective than previous techniques for training users with simulated conversations. Previous techniques may create a different language model for each combination of desired attributes for a simulated conversation. For example, where it is desired to have simulated conversations with 10 possible difficulty levels and 10 possible subject matters, it may be needed to create 100 different language models. Whenever it is desired to update aspects of the training program or add a new difficulty level or subject matter, it may be required to create additional language models. Creating a language model may require large amounts of training data, computational resources, employee time, and other expenses.

By contrast, the techniques described herein, may use a single statistical language model to simulate conversations covering a wide variety of desired attributes. The language model may be instructed to generate communications according to specific attributes by using the language model with a simulation context corresponding to those attributes. A simulation context may be much more cost effective to obtain or create (such as any of the simulation contexts described herein), and it may be much more cost effective to create a large number of simulation contexts than to create a large number of language models. In addition, since simulation contexts may be easier to create, it may be possible to have a large number of attributes, such as 100 difficulty levels instead of 10 difficulty levels or 100 subject matters instead of 10 different subject matters.

Having a larger number of simulation contexts may also provide improved training for users. For example, having more options for difficulty levels or subject matters may allow for adapting a training session more specifically to the needs of the user being trained. As a result, users may be trained more quickly or may have higher proficiency at the conclusion of the training process.

Figure 11:
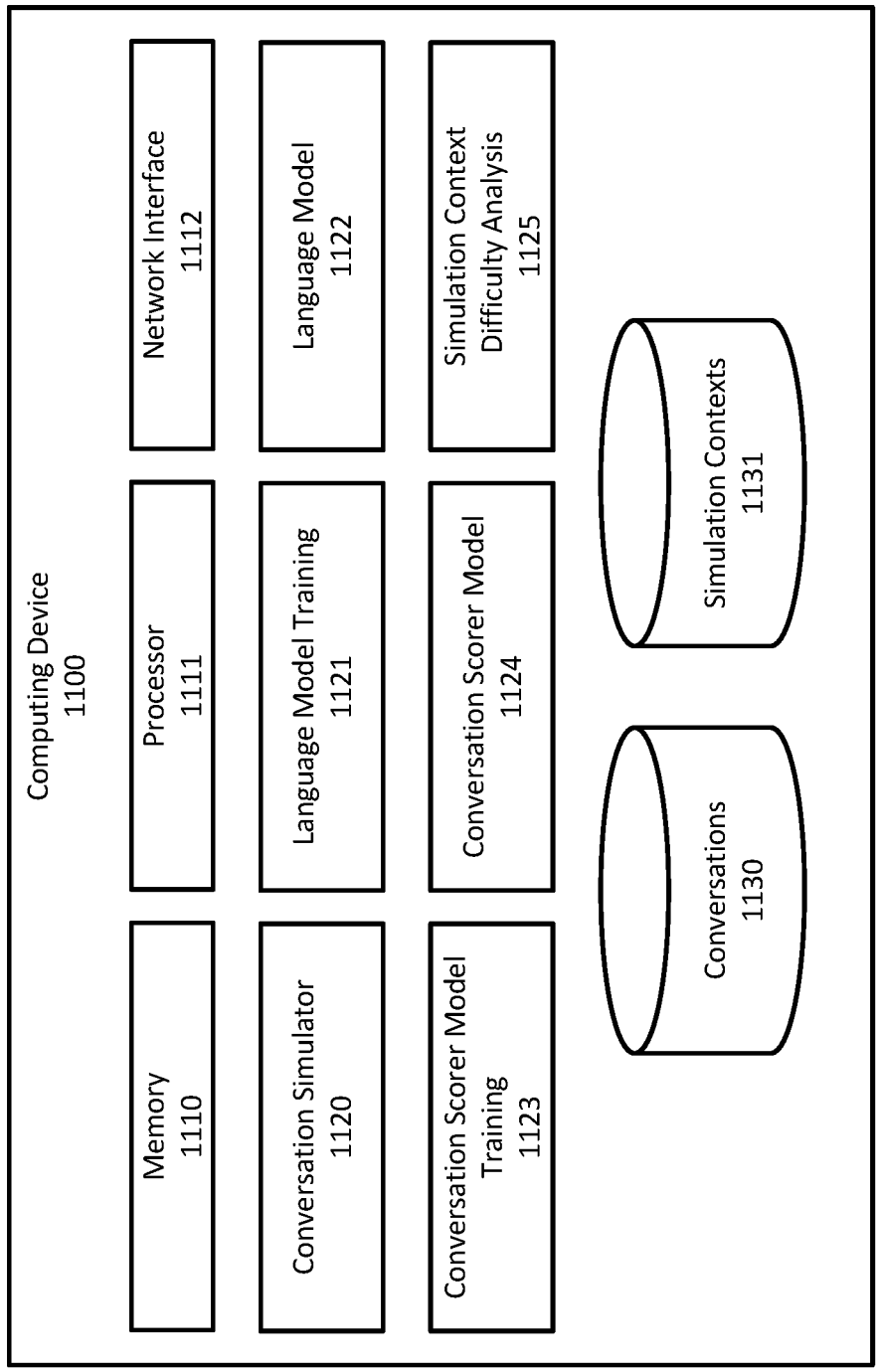
FIG. 11 illustrates components of an example computing device for implementing a conversation simulator.

FIG. 11 illustrates components of one implementation of a computing device 1100 for implementing any of the techniques described herein. In FIG. 11, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1100 may include any components typical of a computing device, such as volatile or nonvolatile memory 1110, one or more processors 1111, and one or more network interfaces 1112. Computing device 1100 may also include any input and output components, such as displays, keyboards, and touch screens. Computing device 1100 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1100 may have a conversation simulator component 1120 that may allow a user to participate in conversations with a simulated user using any of the techniques described herein. Computing device 1100 may have a language model component 1121 that may train a statistical language model using any of the techniques described herein. Computing device 1100 may have a language model component 1122 that may predict likely tokens to follow an input sequence of tokens using any of the techniques described herein. Computing device 1100 may have a conversation scorer model training component 1123 that may train a conversation scorer model using any of the techniques described herein. Computing device 1100 may have a conversation scorer model component 1124 that may process a conversation to compute a score for the performance of a user in the conversation using any of the techniques described herein. Computing device 1100 may have a simulation context difficulty analysis component 1125 that may grade the difficulty level of a simulation context using any of the techniques described herein.

Computing device 1100 may include or have access to various data stores. Data stores may use any known storage technology such as files, relational databases, non-relational databases, or any non-transitory computer-readable media. Computing device 1100 may have a conversations data store 1130 that stores conversation data, such as text or audio of conversations, that may be used to train models or generate simulation contexts using any of the techniques described herein. Computing device 1100 may have a simulation contexts data store 1131 that stores simulation contexts that may be used to simulate conversations using any of the techniques described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
    starting a simulated conversation between a user of a first user-type and a simulated user of a second user-type;
    obtaining a statistical language model, wherein the statistical language model represents natural language communications of the second user-type and the statistical language model was trained on natural language communications between users of the first user-type and users of the second user-type;
    obtaining a set of graded simulation contexts, wherein the set of graded simulation contexts comprise graded conversations from an archive of conversations generated by iterating over conversations in a conversations data store;
    selecting a first simulation context from the set of graded simulation contexts, wherein the first simulation context comprises a first sequence of communications, and wherein the first simulation context is graded to have a first difficulty level;
    presenting the first simulation context to the user;
    receiving a first natural language communication from the user;
    initializing the statistical language model for the first difficulty level by processing the first sequence of communications with the statistical language model, wherein the first sequence of communications includes at least one special token that identifies a user-type of a communication;
    generating a second natural language communication by processing the first natural language communication with the statistical language model, wherein the second natural language communication is responsive to the first natural language communication;
    presenting the second natural language communication to the user as a simulated communication from the simulated user;
    processing natural language communications of the simulated conversation with a conversation scorer model to determine a performance score for the user in the simulated conversation;
    selecting a second simulation context from the set of graded simulation contexts, wherein the second simulation context comprises a second sequence of communications, and wherein the second simulation context is graded to have a second difficulty level and wherein the second simulation context is selected using the performance score;
    initializing the statistical language model for the second difficulty level by processing the second sequence of communications with the statistical language model thereby instructing the statistical language model to generate communications that are adapted to the user; and
    implementing a second simulated conversation using the statistical language model and the second simulation context.

2. The computer-implemented method of claim 1, wherein the statistical language model is a neural network language model.

3. The computer-implemented method of claim 1, wherein generating the second natural language communication comprises:
    tokenizing the first natural language communication to obtain a sequence of tokens;
    obtaining token embeddings for the sequence of tokens; and
    obtaining positional encodings for the sequence of tokens.

4. The computer-implemented method of claim 1, wherein generating the second natural language communication comprises processing the first natural language communication with one or more transformer decoder blocks.

5. The computer-implemented method of claim 1, wherein generating the second natural language communication comprises generating tokens of the second natural language communication sequentially using top-p or top-k sampling.

6. The computer-implemented method of claim 1, wherein the first natural language communication comprises text.

7. The computer-implemented method of claim 1, wherein the first simulation context comprises a sequence of natural language communications from an archived conversation between two users.

8. The computer-implemented method of claim 1, wherein the first simulation context comprises a representation of natural language from an archived conversation between two users.

9. A system, comprising:
    at least one server computer comprising at least one processor and at least one memory, the at least one server computer configured to:
        start a simulated conversation between a user of a first user-type and a simulated user of a second user-type;
        obtain a statistical language model, wherein the statistical language model represents natural language communications of the second user-type and the statistical language model was trained on natural language communications between users of the first user-type and users of the second user-type;
        obtain a set of graded simulation contexts, wherein the set of graded simulation contexts comprise graded conversations from an archive of conversations generated by iterating over conversations in a conversations data store;

select a first simulation context from the set of graded simulation contexts, wherein the first simulation context comprises a first sequence of communications, and wherein the first simulation context corresponds to is graded to have a first difficulty level;

receive a first natural language communication from the user;

initializing the statistical language model for the first difficulty level by processing the first sequence of communications with the statistical language model thereby instructing the statistical language model to generate communications that are adapted to the user, wherein the first sequence of communications includes at least one special token that identifies a user-type of a communication;

generate a second natural language communication by processing the first natural language communication with the statistical language model;

present the second natural language communication to the user as a simulated communication from the simulated user; and process natural language communications of the simulated conversation with a conversation scorer model to determine a performance score for the user in the simulated conversation.

10. The system of claim 9, wherein the at least one server computer is configured to generate the second natural language communication by processing, with the statistical language model all natural language communications in the simulated conversation before the first natural language communication.

11. The system of claim 9, wherein the first difficulty level was determined by:

obtaining a second statistical language model, wherein the second statistical language model represents communications of the second user-type;

executing an automated simulated conversation using the statistical language model and the second statistical language model, wherein in the automated simulated conversation is between a simulated user of the first user-type and a simulated user of the second user-type;

processing communications of the automated simulated conversation with the conversation scorer model to determine a simulation score for the automated simulated conversation; and determining the first difficulty level using the simulation score.

12. The system of claim 9, wherein the first user-type is an agent and the second user-type is a customer.

13. The system of claim 9, comprising:

starting a second simulated conversation between the user and the simulated user; and selecting a second simulation context from the set of graded simulation contexts, wherein the second simulation context corresponds to a second difficulty level and the second simulation context is selected using the performance score.

14. The system of claim 9, comprising:

starting a second simulated conversation between the user and the simulated user; and selecting a second simulation context from the set of graded simulation contexts, wherein the second simulation context corresponds to a second topic that is different from a first topic of the first simulation context.

15. The system of claim 9, wherein the first simulation context comprises a sequence of natural language communications from an archived conversation between two users.

16. The system of claim 9, wherein the first simulation context comprises a representation of natural language from an archived conversation between two users.

17. One or more non-transitory, computer-readable media comprising computer-executable instructions that, when executed, cause at least one processor to perform actions comprising:

starting a simulated conversation between a user of a first user-type and a simulated user of a second user-type;

obtaining a statistical language model, wherein the statistical language model represents natural language communications of the second user-type and the statistical language model was trained on natural language communications between users of the first user-type and users of the second user-type;

obtaining a set of graded simulation contexts, wherein the set of graded simulation contexts comprise graded conversations from an archive of conversations generated by iterating over conversations in a conversations data store;

selecting a first simulation context from the set of graded simulation contexts, wherein the first simulation context comprises a first sequence of communications, and wherein the first simulation context is graded to have to a first difficulty level;

receiving a first natural language communication from the user;

initializing the statistical language model for the first difficulty level by processing the first sequence of communications with the statistical language model thereby instructing the statistical language model to generate communications that are adapted to the user, wherein the first sequence of communications includes at least one special token that identifies a user-type of a communication;

generating a second natural language communication by processing the first natural language communication with the statistical language model;

presenting the second natural language communication to the user as a simulated communication from the simulated user; and processing natural language communications of the simulated conversation with a conversation scorer model to determine a performance score for the user in the simulated conversation.

18. The one or more non-transitory, computer-readable media of claim 17, wherein the actions comprise:

starting a second simulated conversation between the user and the simulated user; and selecting a second simulation context from the set of graded simulation contexts, wherein the second simulation context corresponds to a second difficulty level and the second simulation context is selected using the performance score.

19. The one or more non-transitory, computer-readable media of claim 17, wherein the first simulation context comprises a sequence of natural language communications from an archived communication session between two users.

20. The one or more non-transitory, computer-readable media of claim 17, wherein generating the second natural language communication comprises processing the first natural language communication with one or more transformer decoder blocks.

\* \* \* \* \*